US010131829B2

(12) United States Patent
Deur-Bert et al.

(10) Patent No.: US 10,131,829 B2
(45) Date of Patent: Nov. 20, 2018

(54) COMPOSITION CONTAINING 2,3,3,3-TETRAFLUOROPROPENE AND 1,2-DIFLUOROETHYLENE

(71) Applicant: ARKEMA FRANCE, Colombes (FR)

(72) Inventors: Dominique Deur-Bert, Charly (FR); Laurent Wendlinger, Soucieu en Jarrest (FR)

(73) Assignee: ARKEMA FRANCE, Colombes (FR)

( * ) Notice: Subject to any disclaimer, the term of this patent is extended or adjusted under 35 U.S.C. 154(b) by 0 days.

(21) Appl. No.: 15/490,541

(22) Filed: Apr. 18, 2017

(65) Prior Publication Data

US 2017/0218241 A1  Aug. 3, 2017

Related U.S. Application Data

(62) Division of application No. 14/651,925, filed as application No. PCT/FR2013/052972 on Dec. 6, 2013, now Pat. No. 9,683,155.

(30) Foreign Application Priority Data

Dec. 26, 2012  (FR) ..................................... 12 62765

(51) Int. Cl.
C09K 5/04       (2006.01)
H01B 3/56       (2006.01)
C09K 3/00       (2006.01)
B01F 17/00      (2006.01)
C09K 3/30       (2006.01)
C09K 3/14       (2006.01)

(52) U.S. Cl.
CPC .......... *C09K 5/045* (2013.01); *B01F 17/0035* (2013.01); *B01F 17/0085* (2013.01); *C09K 3/00* (2013.01); *C09K 3/1472* (2013.01); *C09K 3/30* (2013.01); *H01B 3/56* (2013.01); *C09K 2205/126* (2013.01); *C09K 2205/13* (2013.01); *C09K 2205/22* (2013.01); *C09K 2205/32* (2013.01)

(58) Field of Classification Search
CPC .......... C09K 2205/126; C09K 2205/22; C09K 2205/32; C09K 5/045
See application file for complete search history.

(56) References Cited

U.S. PATENT DOCUMENTS

| 8,070,977 | B2 | 12/2011 | Rached |
| 8,075,798 | B2 | 12/2011 | Rached |
| 8,246,850 | B2 | 8/2012 | Rached |
| 8,252,198 | B2 | 8/2012 | Rached |
| 8,557,135 | B2 | 10/2013 | Rached et al. |
| 8,808,569 | B2 | 8/2014 | Rached |
| 8,858,824 | B2 | 10/2014 | Boussand |
| 8,858,825 | B2 | 10/2014 | Guerin et al. |
| 9,011,711 | B2 | 4/2015 | Rached |
| 9,028,706 | B2 | 5/2015 | Rached et al. |
| 9,039,922 | B2 | 5/2015 | Rached |
| 9,127,191 | B2 | 9/2015 | Rached |
| 9,133,379 | B2 | 9/2015 | Rached |
| 9,175,203 | B2 | 11/2015 | Rached |
| 9,267,064 | B2 | 2/2016 | Rached |
| 9,315,708 | B2 | 4/2016 | Guerin et al. |
| 9,399,726 | B2 | 7/2016 | Rached |
| 9,505,968 | B2 | 11/2016 | Rached |
| 9,512,343 | B2 | 12/2016 | Rached et al. |
| 9,599,381 | B2 | 3/2017 | Rached |
| 9,650,551 | B2 | 5/2017 | Collier et al. |
| 9,650,553 | B2 | 5/2017 | Deur-Bert et al. |
| 9,663,697 | B2 | 5/2017 | Rached |
| 9,676,984 | B2 | 6/2017 | Guerin et al. |
| 9,683,155 | B2 | 6/2017 | Deur-Bert et al. |
| 9,683,157 | B2 | 6/2017 | Rached |
| 9,884,984 | B2 | 2/2018 | Rached |
| 9,908,828 | B2 | 3/2018 | Rached et al. |
| 9,969,918 | B2 | 5/2018 | Deur-Bert et al. |
| 10,023,780 | B2 | 7/2018 | Guerin et al. |
| 2011/0084228 | A1 | 4/2011 | Rached |
| 2011/0095224 | A1 | 4/2011 | Rached |
| 2011/0186772 | A1 | 8/2011 | Rached |
| 2011/0219791 | A1 | 9/2011 | Rached |
| 2011/0219792 | A1 | 9/2011 | Rached |
| 2011/0240254 | A1 | 10/2011 | Rached |
| 2011/0252801 | A1 | 10/2011 | Minor et al. |
| 2011/0253927 | A1 | 10/2011 | Minor et al. |
| 2011/0284181 | A1 | 11/2011 | Rached |
| 2012/0049104 | A1 | 3/2012 | Rached |
| 2012/0056123 | A1 | 3/2012 | Rached |
| 2012/0068105 | A1 | 3/2012 | Rached et al. |
| 2012/0144857 | A1 | 6/2012 | Rached |
| 2012/0151958 | A1 | 6/2012 | Rached |
| 2012/0151959 | A1 | 6/2012 | Rached |
| 2012/0153213 | A1 | 6/2012 | Rached |
| 2012/0159982 | A1 | 6/2012 | Rached |
| 2012/0161064 | A1 | 6/2012 | Rached |

(Continued)

FOREIGN PATENT DOCUMENTS

WO   WO 2012/011609 A1   1/2012

OTHER PUBLICATIONS

International Search Report (PCT/ISA/210) dated Mar. 11, 2014, by the Japanese Patent Office as the International Searching Authority for International Application No. PCT/FR2013/052972.

(Continued)

*Primary Examiner* — John R Hardee
(74) *Attorney, Agent, or Firm* — Buchanan Ingersoll & Rooney P.C.

(57) ABSTRACT

Compositions containing 2,3,3,3-tetrafluoropropene and 1,2-difluoroethylene, that can be used in multiple fields of application. The composition can include from 45 to 90 mol % of 2,3,3,3-tetrafluoropropene and from 55 to 10 mol % of, 1,2-difluoroethylene. The composition can include from 55 to 80 mol % of 2,3,3,3-tetrafluoropropene and from 45 to 20 mol % of 1,2-difluoroethylene. The composition can include from 62 to 69 mol % of 2,3,3,3-tetrafluoropropene and from 38 to 31 mol % of 1,2-difluoroethylene at a temperature of between −30° C. and 56° C. and a pressure of between 1 and 15 bar.

8 Claims, No Drawings

(56) References Cited

U.S. PATENT DOCUMENTS

| | | |
|---|---|---|
| 2012/0167615 A1 | 7/2012 | Rached |
| 2012/0205574 A1 | 8/2012 | Rached et al. |
| 2013/0092869 A1 | 4/2013 | Boussand |
| 2013/0105296 A1 | 5/2013 | Chaki et al. |
| 2013/0105724 A1 | 5/2013 | Boussand |
| 2013/0186114 A1 | 7/2013 | Guerin et al. |
| 2014/0008565 A1 | 1/2014 | Rached et al. |
| 2014/0075969 A1 | 3/2014 | Guerin et al. |
| 2014/0318160 A1 | 10/2014 | Rached |
| 2014/0326017 A1 | 11/2014 | Rached |
| 2015/0027146 A1 | 1/2015 | Boussand |
| 2015/0152306 A1 | 6/2015 | Rached |
| 2015/0152307 A1 | 6/2015 | Rached |
| 2015/0322317 A1 | 11/2015 | Collier et al. |
| 2015/0322321 A1 | 11/2015 | Deur-Bert et al. |
| 2015/0344761 A1 | 12/2015 | Rached |
| 2015/0353799 A1 | 12/2015 | Deur-Bert et al. |
| 2015/0353802 A1 | 12/2015 | Rached |
| 2015/0376486 A1* | 12/2015 | Hashimoto ............ C09K 5/045 252/67 |
| 2016/0009555 A1 | 1/2016 | Bonnet et al. |
| 2016/0024363 A1 | 1/2016 | Rached |
| 2016/0025394 A1 | 1/2016 | Rached |
| 2016/0115361 A1 | 4/2016 | Boussand |
| 2016/0122609 A1 | 5/2016 | Rached |
| 2016/0194541 A1 | 7/2016 | Guerin et al. |
| 2016/0244652 A1 | 8/2016 | Rached |
| 2016/0272561 A1 | 9/2016 | Rached et al. |
| 2016/0298014 A1 | 10/2016 | Rached |
| 2016/0355718 A1 | 12/2016 | Rached |
| 2016/0376484 A1 | 12/2016 | Guerin et al. |
| 2017/0037291 A1 | 2/2017 | Rached et al. |
| 2017/0080773 A1 | 3/2017 | Rached |
| 2017/0145276 A1 | 5/2017 | Rached |
| 2017/0210960 A1 | 7/2017 | Deur-Bert et al. |
| 2017/0210962 A1 | 7/2017 | Collier et al. |
| 2017/0218242 A1 | 8/2017 | Rached |
| 2018/0086173 A1 | 3/2018 | Rached |
| 2018/0134936 A1 | 5/2018 | Rached |
| 2018/0148395 A1 | 5/2018 | Rached et al. |

OTHER PUBLICATIONS

U.S. Appl. No. 15/820,996, Rached.
U.S. Appl. No. 15/997,077, Guerin, et al.
U.S. Appl. No. 16/034,529, Boussand.
Rached, Wissam, U.S. Appl. No. 15/820,996 entitled "Method for Heating and/or Air Conditioning a Vehicle," filed Nov. 22, 2017.
Guerin, Sophie, et al., U.S. Appl. No. 15/997,077 entitled "2,3,3,3-Tetrafluoropropene Compositions Having Improved Miscibility," filed Jun. 4, 2018.
Boussand, Beatrice, U.S. Appl. No. 16/034,539 entitled "Stable 2,3,3,3-Tetrafluoropropene Composition," filed Jul. 13, 2018.
U.S. Appl. No. 13/128,996, filed May 12, 2011, Wissam Rached, (Cited herein as U.S. Patent Application Publication No. 2011/0219791 A1 of Sep. 15, 2011).
U.S. Appl. No. 13/146,721, filed Jul. 28, 2011, Wissam Rached, (Cited herein as U.S. Patent Application Publication No. 2011/0284181 A1 of Nov. 24, 2011).
U.S. Appl. No. 13/808,326, filed Jan. 4, 2013, Béatrice Boussand, (Cited herein as U.S. Patent Application Publication No. 2013/0105724 A1 of May 2, 2013).
U.S. Appl. No. 14/371,118, filed Jul. 8, 2014, Béatrice Boussand, (Cited herein as U.S. Patent Application Publication No. 2015/0027146 A1 of Jan. 29, 2015).
U.S. Appl. No. 14/615,780, filed Feb. 5, 2015, Wissam Rached, (Cited herein as U.S. Patent Application Publication No. 2015/0152307 A1 of Jun. 4, 2015).
U.S. Appl. No. 14/722,950, filed Sep. 4, 2015, Phillippe Bonnet, (Cited herein as U.S. Patent Application Publication No. 2016/0009555 A1 of Jan. 14, 2016).
U.S. Appl. No. 14/990,159, filed Jan. 7, 2016, Béatrice Boussand, (Cited herein as U.S. Patent Application Publication No. 2016/0115361 A1 of Apr. 28, 2016).
U.S. Appl. No. 15/238,883, filed Aug. 17, 2016, Wissam Rached, (Cited herein as U.S. Patent Application Publication No. 2016/0355718 A1 of Dec. 8, 2016).
U.S. Appl. No. 15/297,569, filed Oct. 19, 2016, Wissam Rached, (Cited herein as U.S. Patent Application Publication No. 2017/0037291 A1 of Feb. 9, 2017).
U.S. Appl. No. 15/368,347, filed Dec. 2, 2016, Wissam Rached, (Cited herein as U.S. Patent Application Publication No. 2017/0080773 A1 of Mar. 23, 2017).
U.S. Appl. No. 15/396,855, filed Jan. 3, 2017, Wissam Rached, (Cited herein as U.S. Patent Application Publication No. 2017/0145276 A1 of May 25, 2017).
U.S. Appl. No. 15/481,815, filed Apr. 7, 2017, Bertrand Collier, (Cited herein as U.S. Patent Application Publication No. 2017/0210962 A1 of Jul. 27, 2017).
U.S. Appl. No. 15/491,717, filed Apr. 19, 2017, Wissam Rached, (Cited herein as U.S. Patent Application Publication No. 2017/0218242 A1 of Aug. 3, 2017).
U.S. Appl. No. 15/809,164, filed Nov. 10, 2017, Wissam Rached, (Cited herein as U.S. Patent Application Publication No. 2018/0086173 A1 of Mar. 29, 2018).
U.S. Appl. No. 15/820,996, filed Nov. 22, 2017, Wissam Rached.
U.S. Appl. No. 15/856,703, filed Dec. 28, 2017, Wissam Rached, (Cited herein as U.S. Patent Application Publication No. 2018/0134936 A1 of May 17, 2018).
U.S. Appl. No. 15/878,794, filed Jan. 24, 2018, Wissam Rached, (Cited herein as U.S. Patent Application Publication No. 2018/0148395 A1 of May 31, 2018)
U.S. Appl. No. 15/997,077, filed Jun. 4, 2018, Sophie Guerin.
U.S. Appl. No. 16/034,539, filed Jul. 13, 2018, Béatrice Boussand.

\* cited by examiner

COMPOSITION CONTAINING 2,3,3,3-TETRAFLUOROPROPENE AND 1,2-DIFLUOROETHYLENE

CROSS REFERENCE TO RELATED APPLICATIONS

The present application is a continuation of U.S. application Ser. No. 14/651,925, filed on Jun. 12, 2015, now U.S. Pat. No. 9,683,155, which is a U.S. National Stage of International Application No. PCT/FR2013/052972, filed on Dec. 6, 2013, which claims the benefit of French Application No. 12.62765, filed on Dec. 26, 2012. The entire contents of each of U.S. application Ser. No. 14/651,925, International Application No. PCT/FR2013/052972, and French Application No. 12.62765 are hereby incorporated herein by reference in their entirety.

TECHNICAL FIELD

The present invention relates to compositions comprising 2,3,3,3-tetrafluoropropene and 1,2-difluoroethylene that are useful in many fields of application.

SUMMARY

Fluids based on halocarbons have thus found many applications in various industrial fields, in particular as heat transfer fluid, propellants, foaming agents, blowing agents, gaseous dielectrics, monomer or polymerization medium, support fluids, agents for abrasives, drying agents and fluids for energy production units.

Particular importance is given to fluids that have a low impact on the environment.

The advantage of using azeotropic or quasi-azeotropic fluids is that they do not fractionate during evaporation processes and act (almost) as a pure body. However, it is difficult to identify novel fluids that meet these characteristics, since azeotropes cannot be predicted.

DETAILED DESCRIPTION

The subject of the present invention is an azeotropic or quasi-azeotropic composition comprising the compounds 2,3,3,3-tetrafluoropropene and 1,2-difluoroethylene.

In what follows, the following compounds represent:
2,3,3,3-tetrafluoropropene: HFO-1234yf or 1234yf
1,2-difluoroethylene: HFO-1132 or 1132

The expression "quasi-azeotropic" has a broad meaning and is intended to include the compositions that are strictly azeotropic and those that behave as an azeotropic mixture.

A mixture is azeotropic when the pressure at the dew point is equal to that at the bubble point, which means that the vapor composition is equal to that of the condensed liquid.

A mixture is considered to be quasi-azeotropic when the pressure difference between the pressure at the dew point and the pressure at the bubble point is less than or equal to 5%, on the basis of the pressure at the bubble point.

According to one embodiment, the composition according to the invention comprises, preferably essentially consisting of, from 45 to 90 mol % of 2,3,3,3-tetrafluoropropene and from 55 to 10 mol % of 1,2-difluoroethylene.

According to one embodiment, the composition according to the invention comprises, preferably essentially consisting of, from 55 to 80 mol % of 2,3,3,3-tetrafluoropropene and from 45 to 20 mol of 1,2-difluoroethylene.

According to one particularly preferred embodiment, the composition according to the invention comprises, preferably essentially consisting of, from 62 to 69 mol % of 2,3,3,3-tetrafluoropropene and from 38 to 31 mol % of 1,2-difluoroethylene at a temperature of between −30° C. and 56° C. and a pressure of between 1 and 15 bar.

According to another embodiment the composition according to the invention, comprises at least hydrogen fluoride.

According to one embodiment, the composition according to the invention comprises, preferably essentially consisting of, from 10 to 55 mol % of HF, 30 to 75 mol % of 2,3,3,3-tetrafluoropropene and 15 to 40 mol % of 1,2-difluoroethylene.

The invention also relates to the use of a fluid comprising the composition according to the invention as heat transfer fluid, propellants, foaming agents, blowing agents, gaseous dielectrics, monomer or polymerization medium, support fluids, agents for abrasives, drying agents and fluids for energy production units.

Preferably, the invention relates to the use of a fluid comprising the composition according to the invention as heat transfer fluid in a heat pump or refrigeration plant.

The invention also relates to a heat transfer plant comprising a vapor compression circuit containing a fluid comprising a composition according to the invention as heat transfer fluid or containing a heat transfer fluid as described above.

According to one embodiment, the plant is selected from mobile or stationary plants for heating via a heat pump, for air conditioning, and in particular for motor vehicle air conditioning or for centralized stationary air conditioning, for refrigeration or for freezing and Rankine cycles; and which is preferably, an air conditioning plant.

The invention also relates to a process for heating or cooling a fluid or a body by means of a vapor compression circuit containing a heat transfer fluid, said process successively comprising the evaporation of the heat transfer fluid, the compression of the heat transfer fluid, the condensation of the heat fluid and the expansion of the heat transfer fluid, in which the heat transfer fluid is a fluid comprising a composition according to the invention.

The expression "heat transfer fluid" is understood to mean a fluid capable of absorbing heat by evaporating at low temperature and low pressure and of releasing heat by condensing at high temperature and high pressure, in a vapor compression circuit.

A heat transfer fluid optionally comprises one or more additives which are not heat transfer compounds for the envisaged application. The additives may in particular be selected from lubricants, nanoparticles, stabilizers, surfactants, tracers, fluorescent agents, odorous agents and solubilizing agents, as are well known to a person skilled in the art.

TABLE 1

| Azeotrope | Temperature (° C.) | Mole (%) of 1234yf | Mole (%) of 1132 | Temperature (° C.) | Mole (%) of 1234yf | Mole (%) of 1132 |
|---|---|---|---|---|---|---|
| | Pressure: 1 bar absolute | | | Pressure 3 bar absolute | | |
| 1234yf/1132 | −30 | 62 | 38 | −2 | 65 | 35 |
| | Pressure 10 bar absolute | | | Pressure 15 bar absolute | | |
| 1234yf/1132 | 39 | 67 | 33 | 56 | 69 | 31 |

Embodiments
1. An azeotropic or quasi-azeotropic composition comprising the compounds 2,3,3,3-tetrafluoropropene and 1,2-difluoroethylene.
2. The composition as embodiment 1, characterized in that it comprises, preferably essentially consisting of, from 45 to 90 mol % of and from 55 to 10 mol % of 2,3,3,3-tetrafluoropropene, 1,2-difluoroethylene.
3. The composition as in embodiment 1 or embodiment 2, characterized in that it comprises, preferably essentially consisting of, from 55 to 80 mol % of 2,3,3,3-tetrafluoropropene and from 45 to 20 mol % of 1,2-difluoroethylene.
4. The composition as in any one of the preceding embodiments, characterized in that it comprises, preferably essentially consisting of, from 62 to 69 mol % of 2,3,3,3-tetrafluoropropene and from 38 to 31 mol % of 1,2-difluoroethylene at a temperature of between −30° C. and 56° C. and a pressure of between 1 and 15 bar.
5. The composition as in any one of the preceding embodiments, characterized in that it comprises at least hydrogen fluoride.
6. The composition as in any one of the preceding embodiments, characterized in that it comprises, preferably essentially consisting of, from 10 to 55 mol % of HF, 30 to 75 mol % of 2,3,3,3-tetrafluoropropene and 15 to 40 mol % of 1,2-difluoroethylene.

The invention claimed is:

1. An azeotropic or quasi-azeotropic composition comprising the compounds:
   2,3,3,3-tetrafluoropropene;
   hydrogen fluoride; and
   1,2-difluoroethylene.

2. The azeotropic or quasi-azeotropic composition as claimed in claim 1, wherein the composition comprises:
   from 30 to 75 mol % of 2,3,3,3-tetrafluoropropene;
   from 10 to 55 mol % of HF; and
   from 15 to 40 mol % of 1,2-difluoroethylene.

3. A heat transfer fluid comprising the azeotropic or quasi-azeotropic composition of claim 2 and at least one additive selected from the group consisting of lubricants, nanoparticles, stabilizers, surfactants, tracers, fluorescent agents, odorous agents and solubilizing agents.

4. An azeotropic or quasi-azeotropic composition consisting of the compounds:
   2,3,3,3-tetrafluoropropene;
   hydrogen fluoride; and
   1,2-difluoroethylene.

5. The azeotropic or quasi-azeotropic composition as claimed in claim 4, wherein the composition consists of:
   from 30 to 75 mol % of 2,3,3,3-tetrafluoropropene;
   from 10 to 55 mol % of HF; and
   from 15 to 40 mol % of 1,2-difluoroethylene.

6. A heat transfer fluid comprising the azeotropic or quasi-azeotropic composition of claim 5 and at least one additive selected from the group consisting of lubricants, nanoparticles, stabilizers, surfactants, tracers, fluorescent agents, odorous agents and solubilizing agents.

7. A heat transfer fluid comprising the azeotropic or quasi-azeotropic composition of claim 4 and at least one additive selected from the group consisting of lubricants, nanoparticles, stabilizers, surfactants, tracers, fluorescent agents, odorous agents and solubilizing agents.

8. A heat transfer fluid comprising the azeotropic or quasi-azeotropic composition of claim 1 and at least one additive selected from the group consisting of lubricants, nanoparticles, stabilizers, surfactants, tracers, fluorescent agents, odorous agents and solubilizing agents.

* * * * *